United States Patent [19]
Siems et al.

[11] Patent Number: 5,627,798
[45] Date of Patent: May 6, 1997

[54] HIERARCHICAL TELEMETRY SYSTEM FOR SEISMIC ACQUISITION

[75] Inventors: Lee E. Siems, Simonton; Gary L. Scott, Sugar Land, both of Tex.

[73] Assignee: I/O Exploration Products (U.S.A.), Inc., Stafford, Tex.

[21] Appl. No.: 435,889

[22] Filed: May 5, 1995

[51] Int. Cl.$^6$ .................................................. G01V 1/22
[52] U.S. Cl. ................................. 367/76; 340/825.15
[58] Field of Search ............................... 367/21, 20, 76, 367/78, 79, 80; 340/825.15

[56] References Cited

U.S. PATENT DOCUMENTS

| | | | |
|---|---|---|---|
| Re. 31,559 | 4/1984 | Carter | 367/76 |
| 3,986,162 | 10/1976 | Cholez et al. | 367/79 |
| 4,023,140 | 5/1977 | Siems et al. | 340/15.5 TS |
| 4,092,629 | 5/1978 | Siems et al. | 340/15.5 TS |
| 4,117,448 | 9/1978 | Siems | 340/15.5 TS |
| 4,319,347 | 3/1982 | Savit | 367/52 |
| 4,360,729 | 11/1982 | Harvey et al. | 250/227 |
| 4,787,069 | 11/1988 | Beauducel et al. | 367/79 |
| 4,967,400 | 10/1990 | Woods | 367/76 |
| 5,058,080 | 10/1991 | Siems et al. | 367/79 |
| 5,206,835 | 4/1993 | Beauducel | 367/21 |

FOREIGN PATENT DOCUMENTS

| | | | |
|---|---|---|---|
| 1170756 | 7/1984 | Canada | 349/3 |

*Primary Examiner*—Ian J. Lobo
*Attorney, Agent, or Firm*—Haynes and Boone, L.L.P.; Tim Headley

[57] ABSTRACT

The invention is a seismic acquisition system for communicating seismic sensor signals to a recording unit, including a control unit and analog-to-digital conveyer units connected to the control unit. The conveyer units each include integral interconnecting cables having an hermaphroditic connector at each end, analog seismic sensor inputs and signal processing circuitry disposed within a watertight housing forming part of the cables. The circuitry includes analog-to-digital conveyers connected to the analog inputs, a buffer for digitized signals transmitted to one converter unit from other converter units interconnected to the conveyer unit opposite to the control unit connection, a digital transceiver for retransmission of digitized sensor signals and the buffered signals at a first data rate to the control unit. The control unit includes a second buffer for signals from the conveyer unit and for signals retransmitted from other control units serially codected to the control unit. The control unit further includes a second transceiver for retransmitting buffered signals from the conveyer units and from other control units to the recording unit at a second data rate higher than the first data rate.

A preferred embodiment includes a data buffering unit interconnected between the recording unit and the control unit. The buffering unit comprises another digital transceiver for communicating control signals from the recording unit and sending digited signals to the recording unit, and a buffer for storing digitized signals from the control unit and from other ones of the buffering units interconnected to the one buffering unit.

18 Claims, 8 Drawing Sheets

HIERARCHICAL TELEMETRY SYSTEM FOR SEISMIC ACQUISITION

BACKGROUND OF THE INVENTION

1. Field of the Invention

The present invention relates generally to the field of geophysical exploration apparatus. More specifically, the present invention is related to systems for acquiring seismic data from a plurality of sensors and telemetering the signals acquired by the sensors to a recording unit.

2. Discussion of the Related Art

Seismic exploration is used to determine the presence of subsurface structures in earth formations which may contain useful materials such as petroleum. Seismic exploration methods known in the art include positioning a plurality of acoustic sensors, which can be geophones, at spaced apart locations in a predetermined pattern on the surface of the earth. The earth is then energized by an acoustic energy source typically located at a predetermined position in the vicinity of the geophones. The acoustic energy from the source radiates generally downwardly into the earth. Some of the acoustic energy can be partially reflected back towards the earth's surface by subsurface acoustic impedance boundaries, called reflectors, which may exist within the earth. The reflected acoustic energy can be detected by the geophones. The geophones generate electrical signals proportional to the magnitude of the acoustic energy.

In a typical seismic survey, the electrical signals are digitized, or converted into series of numbers representing the magnitudes of the electrical signals sampled at spaced-apart time intervals. The digitized signals are then typically stored or recorded in a recording unit.

What is of particular interest in seismic exploration is the time, relative to the instant at which the acoustic energy is imparted into the earth by the source, at which each signal from each geophone is generated. Maps denoting the time of arrival of reflected energy at each geophone can be generated from the digitized signals from each geophone. The maps can be further processed by methods known in the art into maps describing the subsurface structures.

It is known in the art to provide a very large number of geophones, sometimes as many as six thousand, and in some instances to provide a plurality of acoustic energy sources, to record a typical seismic survey. As is understood by those skilled in the art, it is desirable to include the signals from such a large number of geophones to enhance the ability to generate a detailed map of the reflectors and other subsurface structures within the earth.

It is also desirable, in order to generate more detailed maps of the subsurface, to preserve a substantial portion of the total frequency spectrum, or bandwidth, of the electrical signals generated by the geophones. As is also understood by those skilled in the art, preserving a substantial portion of the bandwidth during the process of digitizing the electrical signals requires generating digital samples at a rate corresponding to the uppermost frequency to be preserved. In a typical seismic survey, the digital sampling rate can be about 2 milliseconds, or 500 Hz, which can preserve frequencies of up to 250 Hz. Further, each typical digital signal sample comprises twenty-four individual digital "bits". In order to transfer serially the bits in each sample before another sample is taken, that sample must be transmitted to the recording unit at a frequency of no less than 12,000 bits/second (obtained by: 500 Hz/sample/second×24 bits/sample), multiplied by the number of sensors used in the survey. Due to practical electronic circuit limitations, the data must be transmitted at a much higher frequency than determined by the previously described formula.

It is known in the art to provide a telemetry system which generates the digital signal samples at each of the geophones and transmits the samples to the recording unit in a serial format on a single, high frequency telemetry line. Because of the very large number of sensors provided in a typical seismic survey, extending the single, high frequency telemetry line known in the art out to the sensors most distant from the recording unit can be difficult and expensive.

It is also known in the art to provide a plurality of high frequency telemetry units near groups of sensors each having digitizing equipment to reduce dam transmission delays and relieve the telemetry burden on the single, high frequency telemetry line. Using multiple, high frequency telemetry units has the drawbacks of requiring both a large number of high frequency telemetry units and requiring a very large amount of interconnecting cable to connect the high dam rate telemetry units to the recording unit. It can be difficult, expensive, and can consume a large amount of electrical power to operate a large number of the high frequency telemetry units near groups of sensors.

Another drawback to the system known in the art for transferring digitized sensor signals to the recording unit is that during transmission of data to the recording unit the system known in the art typically requires a period of inactivity, called "deadtime", in which no new signals can be acquired or digitized, and consequently no acoustic energy can be imparted to the earth to survey. The system dead-time can cause the system known in the art to consume an excessive amount of time to conduct a seismic survey.

Yet another drawback of the seismic recording system known in the art is that the individual sensor digitizing units and the sensors cannot be individually controlled and tested from the recording unit. Accordingly, problems which may occur in a portion of the survey equipment are difficult and time consuming to isolate.

It is an object of the present invention to provide a seismic acquisition system having serially-linked very high rate telemetry units positioned near the sensor digitizing units to reduce the dead-time of the survey system with a minimum of additional interconnecting cabling.

It is a further object of the present invention to provide a seismic acquisition system having very high data rate telemetry units which can be serially interconnected in order to provide greater geometric flexibility in deployment of geophones on the earth's surface.

It is still a further object of the present invention to provide a seismic acquisition system having sensor digitizing units which are individually controllable and can be tested from the recording unit, or from a high frequency telemetry unit positioned elsewhere in the survey system.

It is yet a further object of the present invention to provide a seismic acquisition system having signal digitizing units which form an integral part of the cables interconnecting the seismic sensors to the recording unit in order to reduce the possibility of loss or destruction of the digitizing units and to reduce the overall size and weight of the acquisition system.

SUMMARY OF THE INVENTION

The present invention is a seismic acquisition system for communicating seismic sensor signals to a recording unit. The system includes a control unit connected to the recording unit and analog-to-digital converter units connected to the control unit. The converter units each include integral interconnecting cables having an hermaphroditic connector at each end, analog seismic sensor inputs and signal processing circuitry disposed within a watertight housing forming part of the interconnecting cables. The signal processing circuitry includes analog-to-digital converters connected to the analog inputs, a buffer for storing digitized signals transmitted to one converter unit from other converter units interconnected to the converter unit opposite to the control unit connection, a digital transceiver for retransmission of digitized sensor signals and the buffered signals at a first data rate to the control unit.

The control unit includes a second buffer for storing signals received from the converter unit and for storing signals received from other control units serially interconnected to the control unit. The control unit further includes a second transceiver for retransmitting buffered signals from the converter units and from the other interconnected control units to the recording unit at a second data rate higher than the first data rate.

A preferred embodiment includes a data buffering unit interconnected between the recording unit and the control unit. The buffering unit comprises another digital transceiver for communicating control signals from the recording unit and sending digitized signals to the recording unit, and a buffer for storing digitized signals from the control unit and from other ones of the buffering units interconnected to the one buffering unit.

DESCRIPTION OF THE PREFERRED EMBODIMENT

The description of the preferred embodiment of the present invention herein first includes a description of a typical configuration of seismic sensors and data recording equipment used in recording a seismic survey, in order to explain the significance of interconnections of certain signal processing units forming part of the present invention. The description of the preferred embodiment will then include more detailed descriptions of the signal processing units of the present invention and the functions of the signal processing units.

1. Seismic equipment configuration

Figure 1:
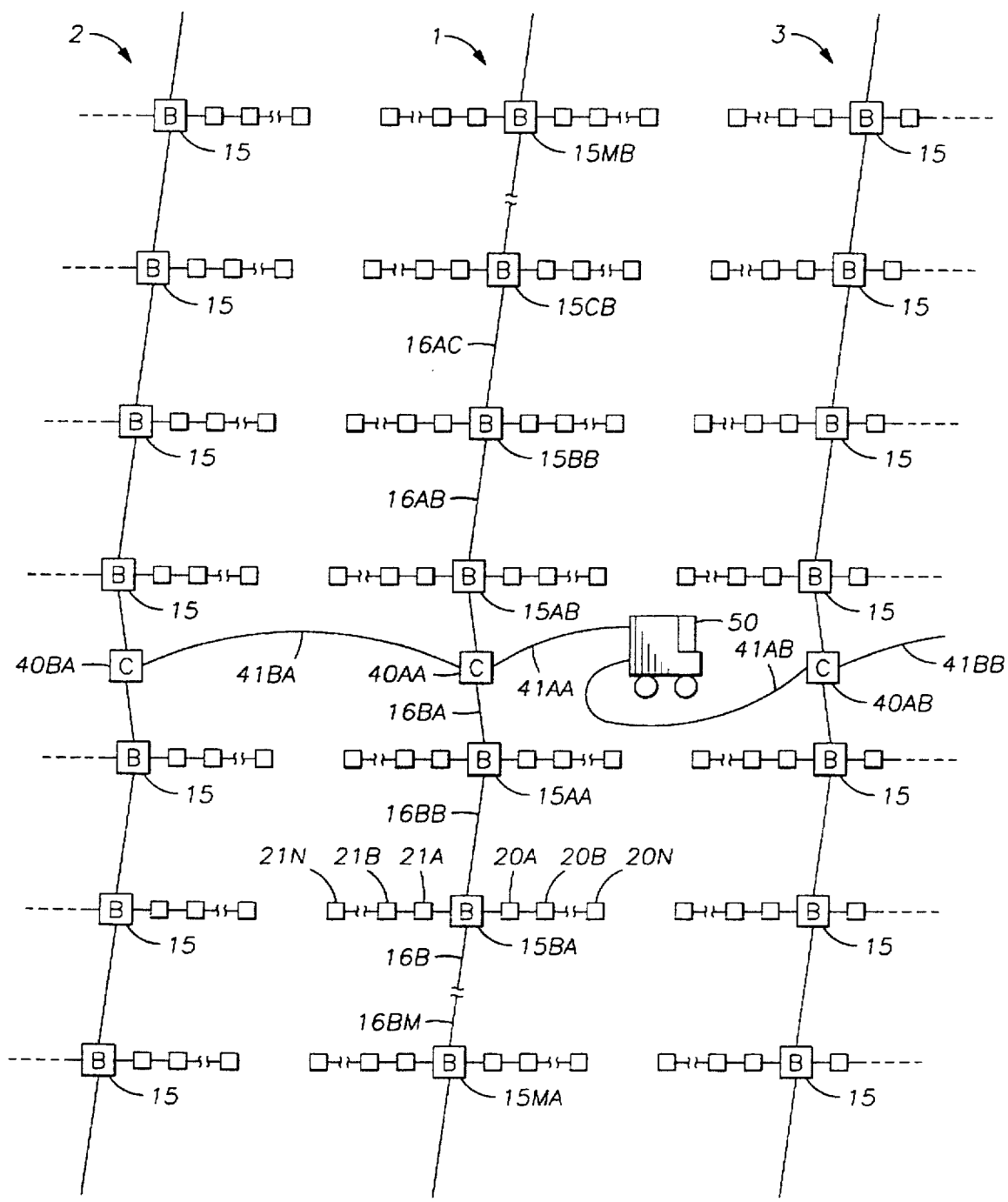
FIG. 1 shows an array of seismic sensors called a "spread".

A typical configuration of seismic survey equipment including the system of the present invention, the configuration being called a "spread" and shown generally at 10, is shown in FIG. 1. A recording unit 50 can be located at any topographically convenient position on the earth's surface relative to the spread 10. The recording unit 50 includes a digital data recorder (not shown separately) capable of simultaneous recording of digital signal samples from as many as 6,000 separate seismic sensor sources, or "channels", each channel representing signals generated by an individual seismic sensor. The seismic sensor can be any type known in the art such as a geophone, a string of geophones wired serially, or a hydrophone. Another type of seismic sensor known in the art compatible with the system of the present invention is a so-called three-component geophone, which includes three, othrogonally positioned sensors each adapted to respond to sensor motion along only one sensitive axis. Each of the three sensor in the three-component gephone is connected to one channel.

The recording unit 50 can further include equipment for controllably initiating a seismic energy source (not shown in FIG. 1 for clarity of the illustration), which will be further explained. "Grids" of seismic sensors which cover a predetermined area on the earth's surface (or on the sea bottom in shallow marine surveys, for example) can be positioned within any geometric pattern the system operator determines is necessary in order to conduct the survey. Methods of determining the geometric pattern are known in the art. For example, a first grid, indicated at 1, positioned approximately in the center of FIG. 1, is shown extending from near the top to near the bottom of FIG. 1. The first grid 1 is linked to the recording unit 50 by a dual-channel optical fiber 41AA, hereinafter referred to as a "C-link", which designation will be further explained. Seismic signal data generated by the seismic sensors within the first grid 1 are ultimately conducted, as will be explained, to a data buffering unit, called a "C-unit" and generally shown at 40AA.

As will also be further explained, the C-unit 40AA can receive digital seismic signal data from two dual-channel optical fibers, such as those shown at 16AB and 16BA and hereinafter referred to as "B-links", for buffering and retransmission of signals sent by a so-called "B-unit" (such as one shown at 15AA), to the recording unit 50 over the C-link 41AA. Typically the digital bit-rate on the C-link is about twice that of signals received over the B-links 16AB, 16BA. The B-links 16AB, 16BA are also used for transmitting command signals generated by the recording unit 50, through the C-unit 40AA to the so-called "B-units", which will be further explained.

The C-unit 40AA can also receive and buffer digital seismic signal data from other C-units, such as one shown for example at 40BA and forming the central data buffering and re-transmission unit for a second grid shown generally at 2. The C-unit 40AA in the first grid 1 receives digitized seismic signals from the C-unit 40BA of the second grid 2, over another C-link, shown as 41BA, which is substantially identical to the C-link 41AA connecting the C-unit 40AA of the first grid 1 to the recording unit 50. Similarly, the C-unit 40BA of the second grid 2, can receive digitized seismic signals from still other grids (not shown) for eventual retransmission to the C-unit 40AA of the first grid 1, and ultimately to the recording unit 50. The connection to the C-units (not shown) of other grids (not shown) are made over other C-links, such as one shown at 41CA.

The recording unit 50 can receive digitized seismic signals simultaneously from two separate C-links, the second C-link shown generally at 41AB and being itself connected to a C-unit 40AB forming the central buffering and retransmission unit for a third grid, shown generally at 3 in FIG. 1.

The structure of the individual grids, such as the first grid 1, includes at least one, and generally includes a plurality of the "B-units". B-units are shown generally at 15AA through 15MA for those B-units in the first grid 1 shown below the C-unit 40AA in FIG. 1. B-units are also shown generally at 15AB through 15MB for the B-units in the first grid 1 shown positioned above the C-unit 40AA in FIG. 1. The B-units 15AA, 15BA which are closest to the C-unit 40AA, are connected to the C-unit 40AA, as previously explained, by the dual-channel optical fiber link called a "B-link", shown as 16AA and 16BA, respectively. The B-units 15AB, 15BB receive command signals in optical telemetry conducted through the C-units from the recording unit 50 and reformat the command signals into electrical telemetry command signals provided to operate signal processing units, called A-units (shown in FIG. 1 as 21A through 21N) which will be explained in more detail.

The B-units, such as 15AB and 15BB, can be interconnected to the closest B-units 15AA, 15BA by other substantially identical B-links, shown generally at 16BB, 16AB. As will be further explained, each B-unit, such as 15AA, has enough internal data storage capacity to receive, buffer and retransmit digital signal from as many as 1,500 individual seismic sensor input channels. As will also be further explained, the B-units such as 15AA can be serially linked to each other by B-links into a series numbering twelve to thirteen of the B-units such as 15AA, depending on the sensor configuration geometry selected by the system operator and whether each B-unit is fully "loaded" with inputs from seismic sensors.

Each B-unit, such as 15AA, is typically connected to the previously described "A-units", shown for example at 21A through 21N as being connected to the B-unit 15BA. The A-units 21A through 21N, as will be further explained, each have three analog signal inputs (not shown in FIG. 1). The analog signal inputs are typically connected to the seismic sensors. The A-units digitize electrical signals generated by the seismic sensors and transmit the digitized signals by electrical signal telemetry to the B-unit to which they are connected.

The A-units, such as 21A-21N, can be assembled serially, as will be further explained, into a "string" having as many as 80 A-units. As will also be further explained, each B-unit such as 15BA can accept input from up to two such "strings", the strings having a total number between them of as many as 80 of the A-units 21A-21N. As shown in FIG. 1, both of the A-unit inputs on each B-unit, such as 15AA, are used in order to form a substantially symmetrical configuration of serially linked A-units (21A-21N, and also 20A-20N) provided to each A-unit input of the B-unit 15AA. In the spread 10 shown in FIG. 1, the configuration of A-units 21A-21N and 20A-20N is repeated at each B-unit such as 15AA-15MA and 15AB-15MB, and that same pattern is repeated within each of the grids shown as 1, 2, and 3. As will be further explained, the sensor configuration shown in FIG. 1 is not exclusive. The seismic acquisition system of the present invention provides a high degree of flexibility in selection of the configuration of the seismic sensors by appropriate selection of A-unit "string" length, interconnection to, and placement of B- and C-units.

The previously described seismic sensors (not shown separately for clarity of the illustration) are connected to analog signal inputs (not shown for clarity) on the A-units 20A-20N. The seismic sensors are positioned in a pattern which can be determined by methods known in the art.

In a typical seismic survey, the seismic energy source (not shown) is initiated by a control signal from the recording unit 50, as previously stated. Acoustic energy radiates into the earth, whereupon some of the acoustic energy can be reflected from acoustic impedance discontinuities which may be present at various depths within the earth. The reflected acoustic energy is transmitted back to the earth's surface where it can be detected by the seismic sensors (not shown) connected to each of the A-units (such as 21A-21N). Electrical signals generated by the sensors in response to the reflected acoustic energy are digitized in the A-units. The digitized signals from the A-units are transmitted electrically to the B-units. The B-units, as will be further explained, convert the electrical signals of the A-units into optical signals for retransmission, either directly to the recording unit 50, or alternatively to a C-unit. If the optical signals are retransmitted to a C-unit, then within the C-unit the signals can be combined with optical telemetry signals from other C-units for eventual retransmission to the recording unit 50, as will be further explained.

The recording unit 50 typically generates a digital record of sensor signal amplitude, with respect to time, for each one of the sensor signals input to each A-unit.

2. System components and signal processing

The configuration and interconnection of equipment used in conducting a seismic survey using the system of the present invention having been explained, it is now possible to describe each of the units of the system in more detail.

The A-unit

Figure 2:
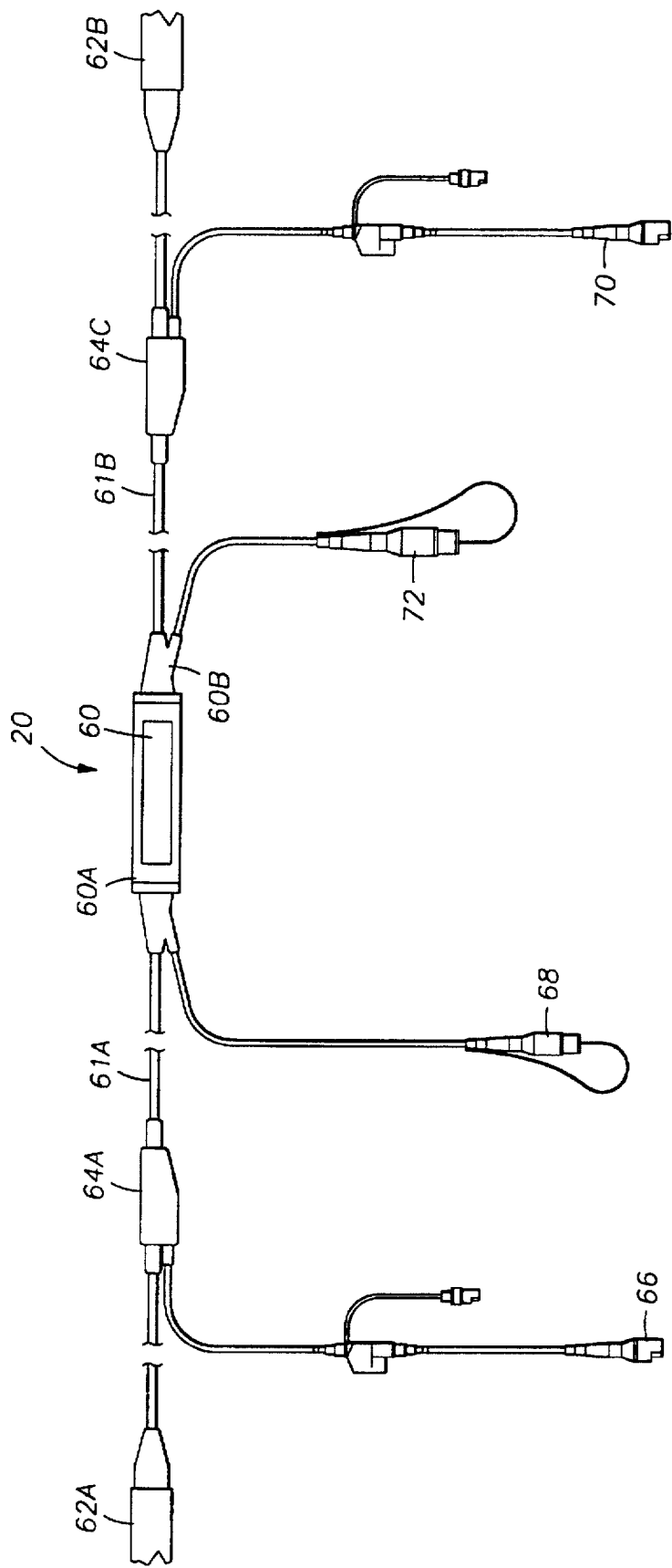
FIG. 2 shows an interconnecting cable unit, called an A-unit, having integral signal processing electronics.

FIG. 2 shows one of the A-units, shown previously as 21A-21N in FIG. 1, which hereinafter will be identified by reference numeral 20. The A-unit 20 comprises a sealed housing 60 which can be substantially cylindrical in shape. Signal processing electronics, as will be further explained, are disposed inside the housing 60. The housing 60 is adapted to withstand immersion in water to exclude moisture from the interior of the housing 60 at depths of as much as 200 meters. The interior of the housing 60 is accessible through removable end plugs 60A, 60B in order to service the electronics. One end plug 60A forms a sealable feed-through for both an "upstream" cable end 61A and one of the three previously described analog signal inputs, which is length of insulated electrical cable called a second geophone take-out 68. The upstream cable end 61A can be of any predetermined length, and preferably can be 43, 87 or 165 meters in length. The upstream cable end 61A terminates in a first geophone take-out 66 (which is also the second of the three analog signal inputs) and an hermaphroditic connector 62A. The connector 62A can be connected one of the A-input terminals (not shown in FIG. 2) of a B-unit (such as one shown at 15AA in FIG. 1) or alternatively to a similar connector located at the cable end of another A-unit. A-units 20 can therefore be serially interconnected in "strings", which can have as many as 80 A-units in such a string, as will be further explained.

The other end cap 60B is a sealable feed-through for an audio channel take-out 72, which can be used to connect field telephones (not shown) to the system. As will be further explained, the audio channel is provided so that the system operator's personnel may communicate over various portions of the spread (10 in FIG. 1), or to the system operator in the recording unit (50 in FIG. 1). The other end cap 60B further forms a sealable feed-through for a "downstream" cable end 61B, which terminates in the third analog input, called the third geophone takeout shown at 70, and a downstream hermaphroditic connector 62B. The downstream cable end 61B on the A-unit 20 can be of similar length to the upstream cable end 61A. The length selected depends on, among other things, the predetermined area of the earth's surface to be covered with sensors in the seismic survey. The downstream connector 62B is substantially the same as, and can mate with the upstream connector 62A, the significance of which will be further explained. The terms "upstream" and "downstream" are used herein to represent an interconnection position of A-units 20 relative to each other and with respect to the B-unit (15AA in FIG. 1). The direction towards the B-unit (15AA in FIG. 1) is generally referred to herein as the upstream direction.

A particular advantage offered by the A-unit 20 of the present invention over seismic acquisition systems known in the art is the inclusion of the signal processing electronics within a section of the cables used to connect the various portions of the spread (shown in FIG. 1 as 10) to the recording unit 50. Using the system of the present invention it is not necessary to provide separate cables and signal processing units, which can reduce the incidence of lost or damaged equipment resulting from using separable cables and signal processing units.

In use, the upstream connector 62A of the A-unit 20 in FIG. 2 will typically be connected in the direction of the B-unit (15AA in FIG. 1), in which case sensor signals applied to the first take-out 66 will be identified in the digital electrical signal telemetry output from the A-unit 20 as being sent in logical data channel one, as will be further explained, and the second 68 and third 70 takeouts will have their corresponding signals identified as being sent in logical data channels two and three of the digital telemetry, respectively.

As will also be further explained, the A-unit 20 is designed to function correctly even if the upstream connector 62A is connected to a downstream A-unit 20. In this case, the signals applied to the take-outs 66, 68, 70 will be assigned, respectively, to the opposite logical data channels in the digital signal telemetry. A particular advantage of the reversible connection capability of the A-unit 20 of the present invention is the reduction of possible error in identifying the individual seismic sensor positions should the hookup to other A-units 20 and to the B-unit (15AA in FIG. 1) be reversed unintentionally. It is a further advantage of the A-unit 20 of the present invention that unintentional laying of the A-unit 20 in a reversed physical orientation does not require picking up the A-unit 20 and turning it around to the "correct" physical orientation. Being able to use the A-unit 20 in a reversed physical orientation can materially reduce the set up time for a typical spread (10 in FIG. 1) using A-units of the present invention by eliminating the need to turn around any reversed orientation A-units 20.

Still a further advantage of the A-units 20 of the present invention is the inclusion of the hermaphroditic connectors 62A and 62B on the cable ends 61A, 61B. As is understood by those skilled in the art, it is commonplace to repair cables in the field which have become damaged. The hermaphroditic connectors used in the present invention eliminate the possibility that an incorrect type or "gender" connector will be attached to a repaired cable end 61A, 61B.

Figure 3:
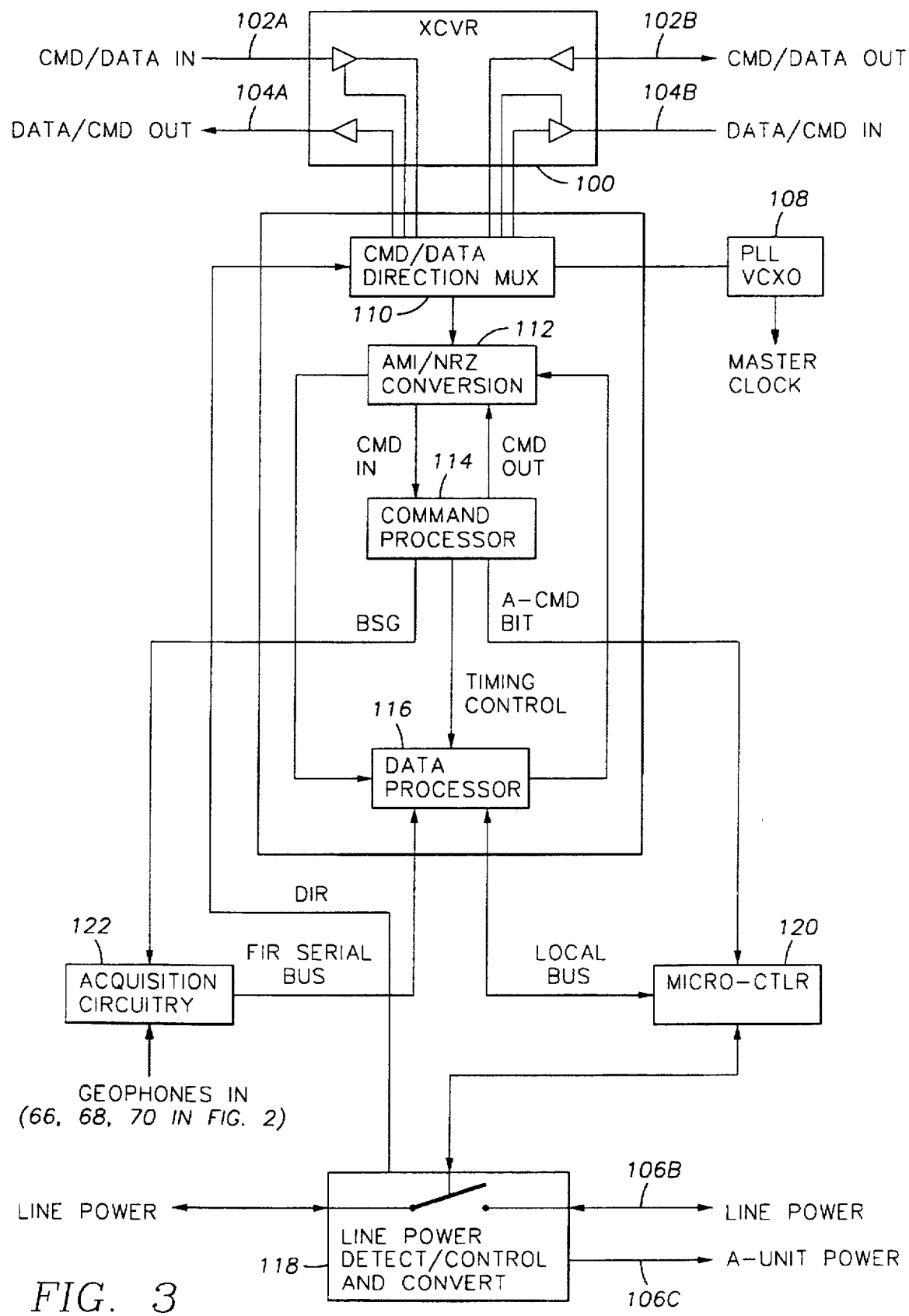
FIG. 3 shows a functional block diagram of the signal processing electronics in the A-unit.

The previously described signal processing electronics of the A-unit (shown as 20 in FIG. 2) can be better understood by referring to FIG. 3. FIG. 3 shows a functional block diagram of the electronics disposed within the housing (60 in FIG. 2) of the A-unit 20. Electrical connections, either to the B-unit (15AA in FIG. 1) or to another A-unit 20 upstream, and/or downstream to other A-units, are made through electrical wires in the cable ends (61A, 61B in FIG. 2). The wires include electrical power lines, 106A (upstream), 106B (downstream), and respectively, command signal lines 102A (upstream), 102B (downstream) and signal lines 104A (upstream), 104B (downstream).

As will be further explained in a detailed description of the B-unit 15AA, electrical operating power for the A-unit 20 is supplied by battery units (not shown in FIG. 3) connected to the B-unit (15AA in FIG. 1). The battery output is converted to 60 volts DC by circuitry in the B-unit, which will be further explained. The 60 volts DC is applied to the present A-unit 20 from one of the power lines 106A (or 106B as will be explained) from the nearest upstream A-unit, or from the B-unit, whichever is directly connected upstream to the present A-unit 20.

A power direction sensing circuit 118 in the present A-unit 20 determines which of the power lines, 106A or 106B, is live, and thereby the direction from which electrical power is applied to the A-unit 20. The output of the direction sensing circuit 118 comprises a digital "one" bit applied to a command/dam direction control and multiplexer circuit 110 in the event the power is detected on the downstream line 106B. A digital "one" is applied in the appropriate position in the digital signal transmitted upstream from the A-trait 20 to indicate that the physical connection of that particular A-unit 20 is "reversed", and therefore logical data channel one represents signal input from the third takeout (70 in FIG. 2), and the second (68 in FIG. 2) and first (66 in FIG. 2) takeouts represent signals from logical channels two and three, respectively. The direction sensing circuit 118, upon detecting power from upstream and receipt of an appropriate command signal from upstream, further conducts the 60 volts to the downstream power line 106B to power-up the next additional A-unit which may be connected downstream of the present A-unit 20. It is to be understood that if the physical orientation of the A-unit is reversed, the DC power enters the present A-unit 20 on the "downstream" power line 106B, and that condition would be detected by the direction sensing circuit 118. DC power applied to the downstream A-units would then be conducted out of the present A-unit 20 on the physical "upstream" power line 106A, which would in this instance become the logical "downstream" power line.

The multiplexer circuit 110 conducts digitized seismic sensor signals from a data processor 116 to a bi-directional digital transceiver 100. The transceiver 100 transmits the digitized sensor signal data upstream either to the B-unit 15AA, or the nearest upstream A-unit 20 (depending what is connected upstream to the present A-unit 20), wherein the digitized signals will be stored in a buffer (not shown separately) for eventual retransmission to the recording unit 50, as will be further explained. The transceiver 100 also receives command signals, directly from the B-unit 15AA, or relayed from the nearest upstream connected A-unit (depending on the upstream connection), conducts the command signals from the B-unit 15AA to a command processor 114 in the present A-unit 20, and relays the command signals to the downstream command line 102B, for retransmission to any A-units connected downstream of the present A-unit 20. The transceiver 100 also extracts a 2.048 Mhz clock signal from the command signals. The transceiver 100 can be transformer-coupled to the upstream 102A, 104A signal lines and to the downstream 102B, 104B signal lines. The significance of the transformer coupling will be further explained.

A phase locked loop/voltage controlled crystal oscillator ("PLL/VCXO") 108 provides initial system timing upon power-up for the multiplexer 110 and the transceiver 100, until command signals are first detected by the transceiver 100. After the detection of command signals, the PLL/VCXO 108 locks on to 2.048 mHz timing signals embedded in the command signals and thereafter provides a master clock signal which is synchronized to the command signals sent from the B-unit 15AA. All the signal processing components of the A-unit 20, are therefore synchronized to the commands transmitted by the B-unit 15AA, as will be further explained.

The telemetry transmitted along the signal lines 102A, 102B and 104A, 104B can be in a format called alternate-mark-inversion ("AMI"). AMI telemetry is known in the art and includes digital "ones" represented as non-zero signal level on the signal line (such as 102A), and digital "zeroes" represented by zero signal level on the signal line (such as 102A). AMI telemetry also has the attribute of the voltage polarity of each successive digital "one" bit being inverted from that of the previous digital "one" bit in order to maintain an average signal voltage level in the signal line (such as 102A) of close to zero. Commands and data are processed within the A-unit 20, on the other hand, in so-called "non-return to zero" (NRZ) format. As is understood by those skilled in the art, NRZ format includes, within a predetermined time period, a voltage level change from zero to the digital line voltage (typically +5 volts) value, or from the line voltage value to zero when the digital bit has a value of "one", and no corresponding voltage level change when the digital bit has a value of "zero". The A-unit 20 includes a NRZ/AMI converter, shown at 112, to change the NRZ digital format of data processed within the A-unit 20 to the AMI format of the telemetry. AMI telemetry is used in the signal lines 102A/B, 104A/B, among other reasons, to provide easier extraction of the previously described 2.048 mHz clock signal from the command signal telemetry.

The transceiver 100 also includes automatic gain control ("AGC") circuitry (not shown separately) for both the command 102A and data signal 104B receiving lines. To maximize the efficiency with which the clock signal is extracted from the command telemetry, and to reduce the possibility of erroneous AGC gain changes in the AGC circuitry during non-recording, or "dead", time (in which most of the data words will consist of "zeroes") by providing a large number of AMI "one" bits in the telemetry, in the preferred embodiment all of the digital signal data to be transmitted by the A-unit 20 can be inverted while in NRZ format before conversion to AMI format. The inversion can be performed in the data processor 116. Command signals transmitted from the B-unit 15AA or from an upstream A-unit 20 are not inverted after conversion to NRZ format.

Sensor signal data sent from the A-unit 20 by the transceiver 100 to the upstream data signal line 104A typically comprises three, twenty-four bit digital words. The words represent the analog signal magnitudes sampled at spaced apart time intervals, each signal corresponding to one of the three previously described logical channels. The signal magnitude words are typically preceded by status information bits, including the previously described connection direction indication bit, and an 8-bit address number unique to each A-unit 20 connected to each B-unit 15AA. The 8-bit address is assigned to each A-unit 20 by the B-unit 15AA after a "power-up" acknowledgement signal is received by the B-unit 15AA from the A-unit 20, as will be further explained.

The data processor 116 includes circuitry (not shown separately for clarity of the illustration) for assembling digitized seismic signal data conducted from acquisition circuitry 122 (which will be further explained), and signal data transmitted to the present A-unit 20 from downstream A-units 20 over the downstream signal line 104B. The data processor 116 circuitry includes a first in/first out ("FIFO") data repeater which retransmits the data received from the downstream A-units 20 in the data telemetry sent upstream by the present A-unit 20. The FIFO repeater is cleared each time a data transmit command is received from the B-unit 15AA (or from the upstream A-unit 20). Data transmit commands are typically repeated every 2 milliseconds. New signal data are input to the FIFO repeater from downstream only upon receipt of the first digital "one" from a downstream A-unit 20 following reception of the data transmit command from the B-unit 15AA. Clearing the FIFO repeater at the start of each data transmission cycle and delaying new data input to the FIFO repeater until subsequent downstream data are received eliminates any propagation time delay between data transmission sequences, hereinafter called "bursts".

Commands transmitted from an upstream A-unit 20 or from the B-unit 15AA are decoded by a command processor 114. Commands are embedded in the telemetry (previously described herein as having a frequency of 2.048 mHz), which has a nominal bit rate of 2.048 million bits-per-second (mbps). The telemetry can be formatted into 128 "frames" each having 32 bits and occurring at a frequency of 64 kHz. The command processor 114 extracts the 8-bit address number assignment provided to the A-unit 20, and extracts configuration control signals for the A-unit 20. Configuration signals can include operating specifications such as whether the A-unit 20 should receive sensor signals or conduct internal self-tests, or the values to which certain system operating parameters such as preamplifier gain should be set, as will be further explained. The command processor 114 also decodes system synchronization signals sent from upstream in the telemetry. System synchronization signals include a so-called "start of scan" command which is a timing instruction from the recording unit 50 for each sensor channel to transmit the signal value at that instant in time. Start of scan commands, as will be further explained, typically are generated every 2 milliseconds. The command processor 114 further extracts a digital test signal sent in the command telemetry which can be used to check the operation of various portions of the A-unit 20 and the seismic sensors, as will be further explained. The digital test signal comprises a series of bits which can be converted in a digital-to-analog converter (not shown) into a precise analog signal used to test the analog signal section (not shown) and digital conversion sections (not shown) of the acquisition circuitry 122. The acquisition circuitry 122 generates digital signal samples from the analog signal inputs (66, 68, 70 in FIG. 2). The acquisition circuitry 122 includes three controllable-gain analog preamplifiers (not shown for clarity of the illustration), three delta-sigma modulators (also not shown for clarity) and three digital finite impulse response ("FIR") filters (also not shown for clarity), all of which can be of types known to those skilled in the art. As previously stated, the acquisition circuitry 122 can be controlled by commands sent from the B-unit 15AA to test the preamplifiers (not shown) by decoding the digital test signal extracted from the command telemetry and passing the test signal through a delta-sigma demodulator (not shown) forming part of the acquisition circuitry 122. Passing the test signal through the demodulator (not shown) provides a precision analog signal to test the preamplifiers. The output of the demodulator (not shown) then can be selectively conducted to the preamplifier inputs. Upon transmission of the appropriate commands in the command signal telemetry, the digital test signal can alternatively be conducted directly (still in digital form) to the inputs of the digital FIR filters (not shown), and the preamplifier inputs can be grounded, in order to test the operation of the digital FIR filters, exclusive of input from the modulator (not shown).

Operation of the A-unit 20 internal test functions, and which data output from the acquisition circuitry 122 are applied to the signal telemetry are controlled by a microcontroller 120 connected to the command processor 114. The microcontroller 120 operates the various internal test and data configuration functions in response to the commands which are decoded by the command processor 114.

Figure 4:
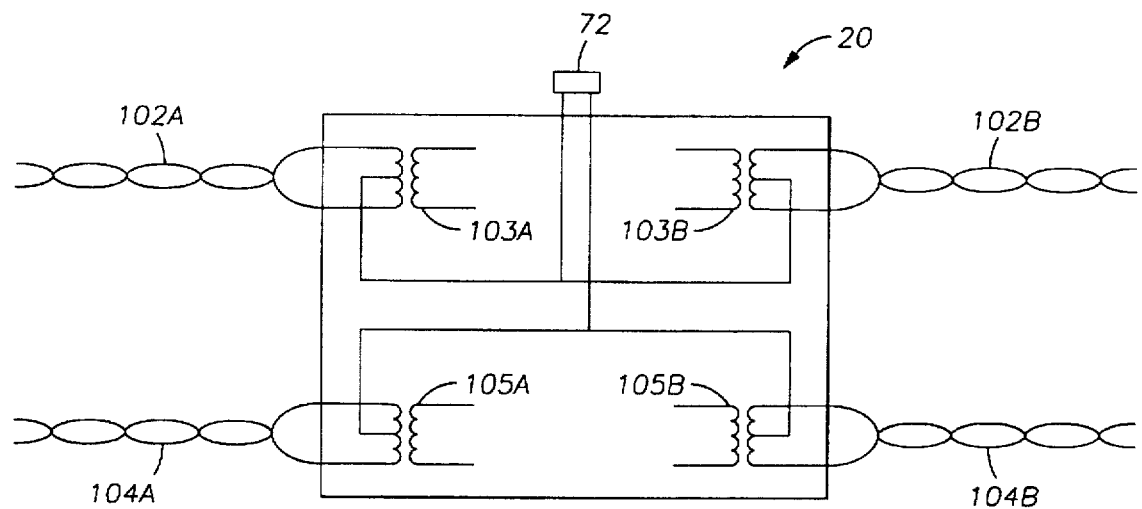
FIG. 4 shows electrical cable connections on the A-unit including a "ghost pair" audio signal channel.

As stated previously, the A-unit 20 includes an audio channel takeout 72 to enable provision of voice communications between various A-units on the spread (10 in FIG. 1) by connecting various telephone equipment to selected A-unit 20 audio channel takeouts 72. As previously described herein, the transceiver 100 can be transformer coupled to the signal lines 102A/B and 104A/B in the cable ends 61A, 61B. Transformer coupling is provided to have audio channel capability without introducing additional cabling and the attendant possibility of signal interference. The audio channel, as shown in FIG. 4, is provided as ghost conductor pair connected to center taps of transformers 103A/B and 105A/B coupling the transceiver 100 to each pair of data/command signal lines 102A/B and 104A/B. The common-mode signal of the audio channel on the ghost pair is rejected by the transceiver (shown as 100 in FIG. 3).

Figure 5:
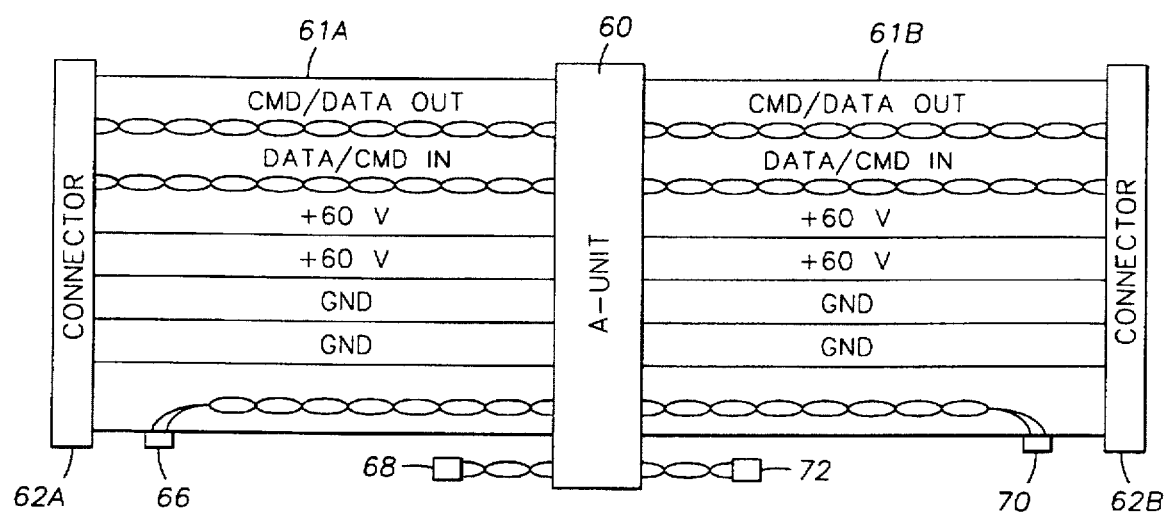
FIG. 5 shows an interconnecting wiring diagram for the A-unit.

A better understanding of the cable interconnections for the A-units 20 can be obtained by referring to FIG. 5. Each cable end 61A, 61B includes two, +60 DC volt power lines (the DC power originating from the B-unit as previously explained), two ground lines, and the previously described pairs of respective command and data signal lines 102A and 102B, 104A and 104B, all of which terminate in the hermaphroditic connectors 62A and 62B.

As previously stated herein, as many as forty A-units 20 can be serially connected to a B-unit in a single "string", since the B-unit has the capability of processing data bursts from as many as forty individual A-units 20. However, sufficient electrical power can be supplied to a string of serially connected A-units 20 having a length of up to about 3,000 meters. As previously stated, the cable ends (61A and 61B in FIG. 2) can have a combined length as much as 330 meters depending on the lengths of the individual cable ends 61A and 61B. If the system configuration is determined to need serially connected A-units 20 in a particular grid (such as 1 in FIG. 1) exceeding a string length of 3,000 meters, then it is necessary to include a battery booster unit, as shown in FIG. 6A at 200, serially inserted in between the cable ends 61A, 61B of two of the A-units 20 to provide sufficient electrical power for all the A-units 20 in the extended length string.

Figure 6A:
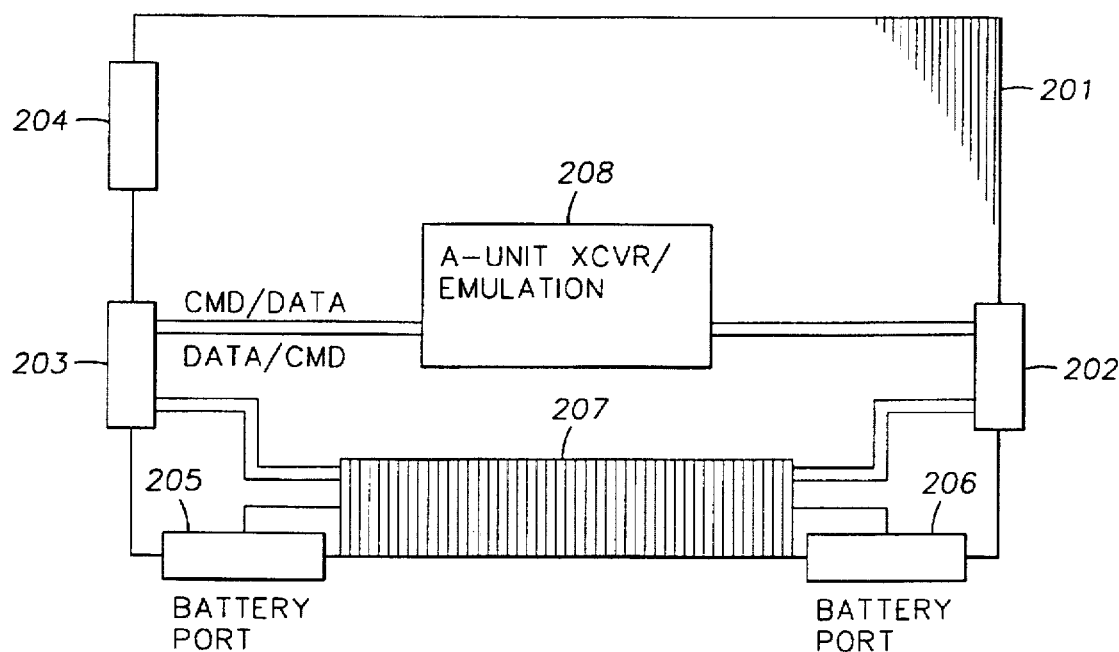
FIG. 6A shows a block diagram of a battery booster unit.

The internal components of the battery booster unit 200 are shown in FIG. 6A. The battery booster 200 is contained within a sealed housing 201. Electrical connection is made into the housing by battery ports, 205,206, to which twelve volt batteries are connected. A-unit ports 203 and 202 are configured substantially identically to the hermaphroditic connectors (shown as 62A and 62B in FIG. 2) at each end of the A-unit (20 in FIG. 2) so that the battery booster 200 can be inserted serially into the cables connecting the A-units 20. A serial interface port 204, known in the art by industry designation RS-232, is provided for interconnection of a computer terminal (not shown) to control various system tests on the battery booster 200 and the A-units. A DC to DC converter section 207 in the housing imparts +60 volts DC to the corresponding lines (shown as 106A and 106B in FIG. 2) upon receipt of a power-up command from the B-unit, as will be further explained. The power up command from the B-unit is the same serially transmitted command that initiates power-up of the A-units 20 in the string. The battery booster 200 further includes an A-unit emulation transceiver 208, which provides data buffering/ retransmission capability similar to that of the A-units 20, and an address generator, forming part of the buffering transceiver 208, which identifies the booster 200 to the B-unit 15AA as a battery booster unit upon receipt of the 8-bit address assignment by the booster unit 200 from the B-unit. As will be further explained, the 8-bit address and the A-unit emulation provision for the booster 200 are necessary because the B-unit individually, serially powers up each A-unit in each string. Presence of DC power on the power lines originating from the booster unit 200 downstream of some of the A-units 20 would erroneously cause those A-units 20 upstream of the booster 200 to interpret that the B-unit was located in the direction of the booster 200 since the power detection circuit (118 in FIG. 3) of those A-units 20 would detect the erroneously transmitted power from the battery booster 200.

Figure 6B:
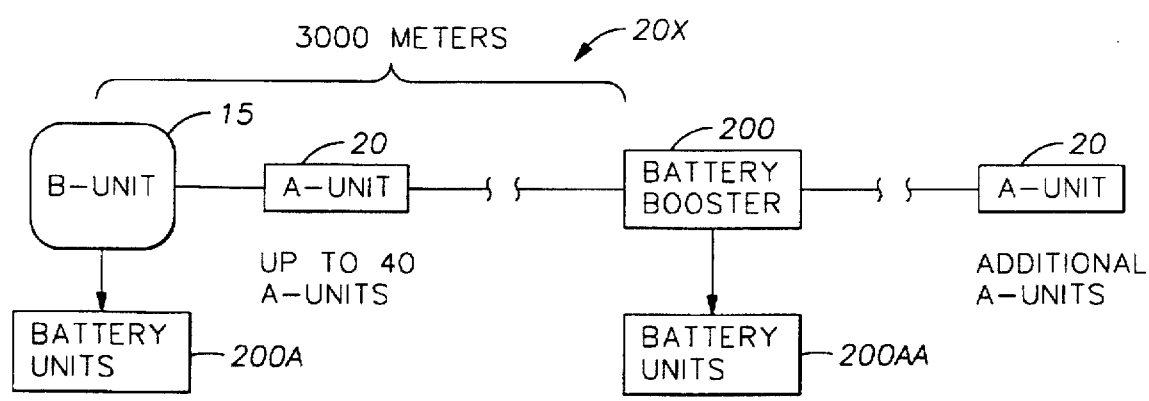
FIG. 6B shows interconnections of the battery booster unit in a string of A-units.

A typical connection scheme for a string of A-units 20 including the battery booster 200 is shown in FIG. 6B. The string of A-units in FIG. 6B can include as many as forty A-units 20 in a section 20X of the string not exceeding a length of 3,000 meters. The section 20X of the string is connected to the B-unit 15AA at one of the A-ports (not shown) provided on the B-unit 15BB. As will be further explained in a detailed description of the B-unit 15AA, a battery unit 200A comprising at least one twelve-volt battery is shown as connected to the B-unit 15AA in order to power the B-unit 15AA and the downstream A-units 20 out to the 3,000 meter length limit of the section 20X. Another battery unit 200AA which can be substantially the same as the battery unit 200A connected to the B-unit 15AA is provided at one of the battery ports (such as 205 in FIG. 6A) on the booster unit 200.

The B-unit

Figure 7:
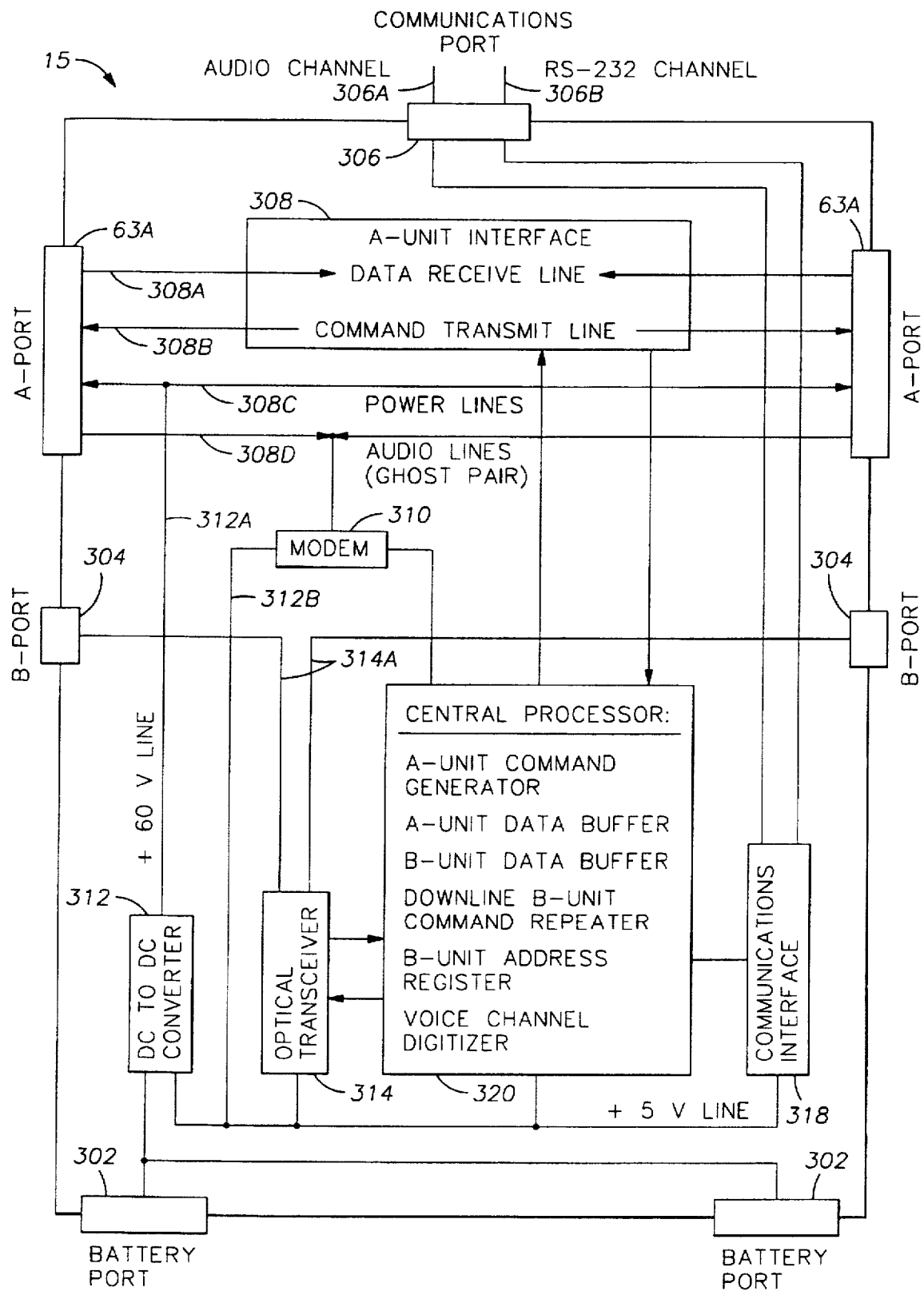
FIG. 7 shows a block diagram of a control unit, called a B-unit.

A functional block diagram describing the components within the B-unit (shown for example as 15AA in FIG. 1 and indicated by reference numeral 15 in the description herein) can be observed by referring to FIG. 7. Electronic components of the B-unit 15 are contained in a water-tight housing 300, which in one embodiment of the invention is capable of withstanding immersion to a water depth of 200 meters. External connections are made to the A-units (shown as 20 in FIG. 2) through A-ports, shown generally at 63A and configured to accept the previously described hermaphroditic connectors attached to the cable ends (shown as 61A and 61B in FIG. 2) of the A-units (shown as 20 in FIG. 2). External connection to battery units (shown as 200A in FIG. 6) can be made at either or both of two battery ports 302. Optical telemetry is provided to B-ports 304, wherein connection to upstream or downstream B-units 15 can be made, or upstream connection either to a C-unit (shown as 40AA in FIG. 1) or directly to the recording unit (shown as 50 in FIG. 1). The B-unit 15 further includes a communications port 306 comprising an audio channel connection 306A and a serial digital connection, designated by industry standard code RS-232, shown generally at 306B, as will be further explained.

As previously explained, the B-unit 15 provides electrical power to the A-units 20 connected to it. Power applied to the battery ports 302 is converted by a DC-to-DC converter 312. The converter 312 provides 60 volts DC to the power lines 308C of the A-ports 63A. The converter 312 also provides 5 volts DC for all the other circuitry of the B-unit 15, which will be further explained. Signals received from the A-units 20 are provided to a data line 308A connected to an A-unit interface 308, which includes a digital transceiver (not shown) similar to the transceiver in the A-units (shown as 100 in FIG. 3). Commands from the B-unit 15 directed to the downstream A-units 20 are provided on a command line 308B exiting the interface 308.

The previously described ghost pair audio channel provided on the signal lines within the A-units 20 (shown generally as 102 and 104 in FIG. 4), shown generally at 308D in FIG. 7 for clarity of the illustration, is connected to a modem 310 so that control commands may be remotely provided to the B-unit 15 from a computer terminal connected to the audio channel takeout (shown at 72 in FIG. 2) at one of the A-units 20. Remote control of the B-unit 15 in order to power up and test the various A-units 20 connected thereto is thereby possible exclusive of control from the recording unit 50. Audio communication is possible between any A-units 20 connected together and to either A-port 62A of the B-unit 15, irrespective of the power-up state of the A-units 20 or the B-unit, since the audio channel is hard-wired through the A-units 20.

Signals received from the A-units 20 in the previously described 2.048 mHz telemetry are conducted to a central processor unit ("CPU") 320. The CPU 320 combines a number of functions, including buffering data from A-units 20 connected downstream; buffering data from other B-units connected downstream, as will be further explained; generating power-up, configuration and synchronization commands for the downstream A-units 20; and inclusion in the telemetry of an audio channel provided to a communications port 306.

Interconnection to other B-units 15, to a C-unit 40AA or to the recording unit 50 is made at either of the B-ports 304, which are adapted to mate with a dual-channel optical fiber contained in one of the B-links (shown for example as 16AA in FIG. 1). The B-ports 304 are both connected to a hi-directional optical transceiver 314. No electrical interconnection is provided through the B-ports 304. The optical transceiver 314 is adapted to determine at which of the B-ports 304 first an optical telemetry signal is first received. That B-port 304 is designated by the CPU 320 to be the upstream port, since the B-unit, when first connected to electrical power is programmed to operate in a so-called "asleep" state until commands are received from upstream, as will be further explained.

As previously explained, when the B-unit 15 is first connected to the battery unit (not shown), the bootstrap instructions resident in read-only-memory (not shown) in the CPU 320 provide for the command generator and relay functions of the CPU 320 to be turned off. Upon receipt of a command on the optical telemetry from one of the B-ports 304, the CPU will designate the receiving B-port 304 as being in the upstream direction. When an appropriate command is received at the upstream port 304, the CPU will either relay a command to the other B-port 304 and thereby to any other B-units 15 connected downstream, or will generate and transmit an electrical telemetry command on the command line 308B to power-up and configure, as commanded, any A-units 20 connected to the A-ports 63A. B-unit commands relayed downstream through the other B-port 304 can include instructions to power-up and configure any A-units 20 connected to the other downstream B-unit 15.

Upon receipt of a power-up command from upstream, the B-unit 15 transmits an acknowledgement signal back upstream. If the acknowledgement signal is received by a B-unit 15 connected upstream, the acknowledgement signal is relayed upstream. If the upstream connection is directly to the recording unit 50, the recording unit will transmit an address code back to the B-unit 15. All data which are subsequently transmitted upstream by the B-unit 15 are identified by a frame header having the address code of that particular B-unit 15.

The optical telemetry can operate at a bit rate of 49.152 mHz using a carrier frequency of 70 mHz. The optical telemetry bit rate of 49.152 mHz is intended to provide a reference signal which can be configured in the CPU 320 into the previously described 2.048 mHz electrical telemetry signal, since the optical telemetry bit rate is a multiple of 24 times the electrical telemetry bit rate. Digital bit modulation of the optical telemetry can be in a format known in the art called phase-shift-keying ("PSK").

The previously described modem 310 provides remote control ability for configuration and testing of the A-units 20 connected to the B-unit 15. A portable computer (not shown) connected to a modem, as previously explained, can be connected to any audio channel takeout 72 on any A-unit 20 which is connected to the B-unit 15, and transmit digital commands to the B-unit 15 over the ghost pair audio channel. The commands are converted in the B-unit modem 310 and transferred to the CPU 320, whereupon the previously described internal test functions for the A-units 20 can be controlled from the computer (not shown).

Control of the B-unit 15, the A-units 20 connected downstream to the B-unit 15 and any other B-units connected downstream to the B-unit 15 can also be controlled by a hand held computer (not shown) connected directly to an RS-232 channel, shown at 306B, in the communications port. Signals applied to the RS-232 channel are converted from serial format of the RS-232 channel into a format compatible with the CPU 320 bus by a communications interface 318. The communications interface 318 also provides 8 kHz sampled digitized audio signal connected to an audio channel 306A in the communications port 306. The digitized audio signal generated in the interface 318 enables telephone handset communication to any other A-, B- or C-unit, or the recording unit 50 in the spread (shown as 10 in FIG. 1). Digitized audio signals from the interface 318 are applied to a channel in the optical telemetry by the CPU 320, or can be reconverted to analog form by the A-unit interface 308 for transmission on the ghost pair to an audio takeout (72 in FIG. 2) on any interconnected A-unit 20.

Digitized sensor signals are received from the A-units 20 as previously described herein. The signals from the A-units 20 are stored in a FIFO buffer (not shown) in the CPU 320, until signals are received from any downstream connected B-units 15. After all the downstream B-units 15 have had their signals transferred to the FIFO buffer, the signals can be transmitted upstream to a C-unit (40AA in FIG. 1) or directly to the recording unit 50 if no C-units are used. As previously described herein, the buffer (not shown) in the B-unit 15 can store data from as many as 1,500 individual channels. Each signal stored in the buffer, from each individual signal channel, is identified by the 8-bit address assignment designated by the B-unit 15 to its interconnected A-units 20, and each "block" of signals originating from A-units 20 connected to a particular B-unit 15 is identified by the address assigned to the particular B-unit 15 by the recording unit 50. Having the A-unit 20 address assignments generated by the B-units 15, and having signal blocks identified by their respective B-units 15 reduces the propagation delay associated with assigning individual signal channel addresses directly from the recording unit 50.

The C-unit

Figure 8:
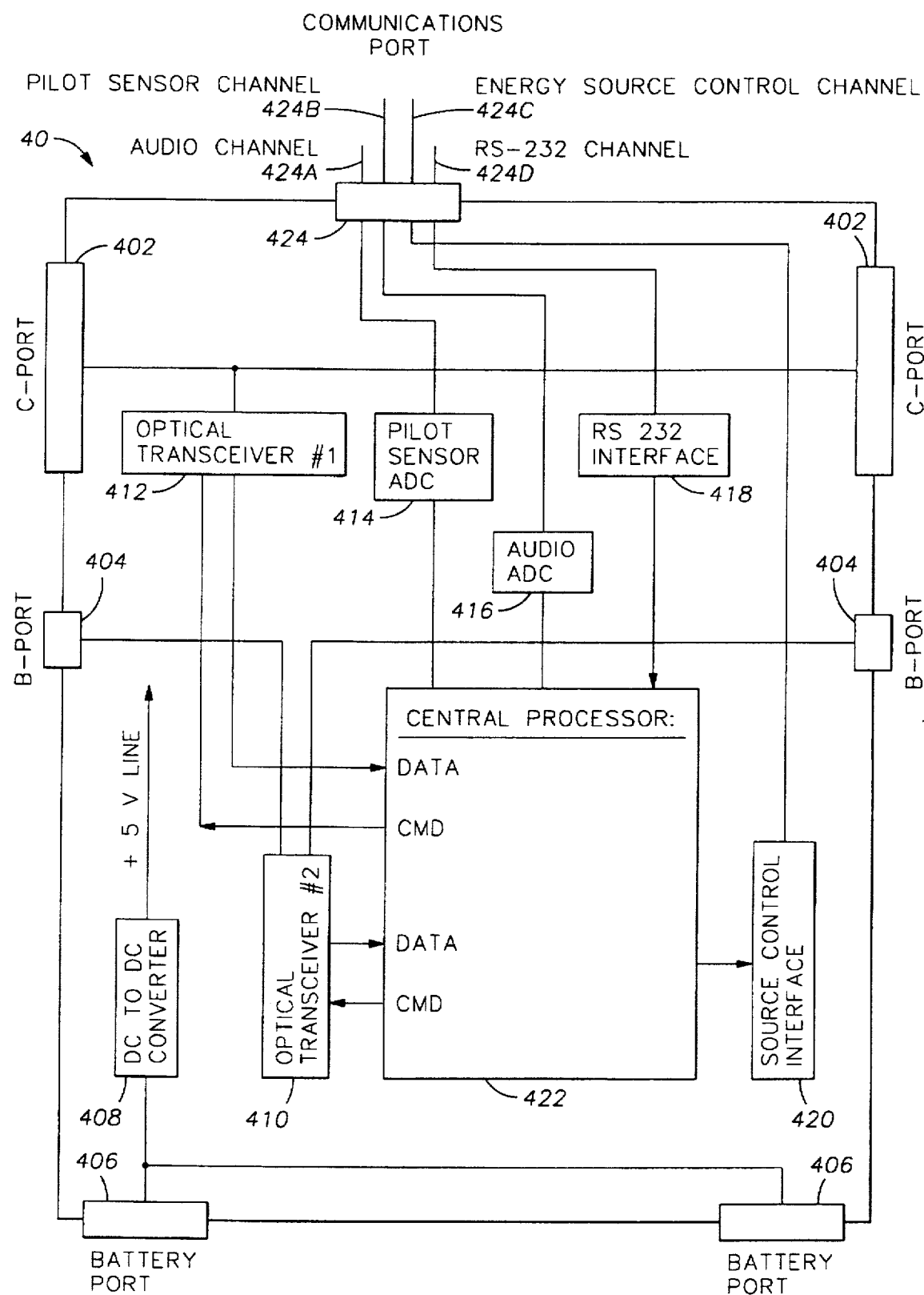
FIG. 8 shows a block diagram of a data buffering unit, called a C-unit.

A functional block diagram of the C-unit, (shown for example as 40AA in FIG. 1) hereinafter designated by reference numeral 40, can be observed by referring to FIG. 8. The C-unit 40 is enclosed in a water tight housing, shown at 400, which can withstand immersion in water to a depth of 200 meters. External connections are made to other C-units 40 or to the recording unit (shown as 50 in FIG. 1) through C-ports 402. The C-ports 402 comprise hermaphroditic fiber-optical connectors for engagement to the previously described dual-channel optical fiber C-links, (shown in FIG. 1 for example as 41AA). Connection to B-units (shown as 15 in FIG. 7) can be made through B-ports 404 comprising hermaphroditic optical connectors similar to those of the C-ports 402. Electrical power can be provided to battery ports 406, these being substantially the same as battery ports on the B-units (shown as 302 in FIG. 7). A communications port 424 can provide an audio channel 424A for connection to a telephone handset (not shown). The communications port 424 further provides an analog input, at 424B, for a pilot sensor (not shown) which can form part of the previously described seismic energy source (not shown). The communications port also includes an RS-232 serial channel, shown at 424D, for connection to a computer terminal (not shown). The communications port 424 also includes a source control channel 424C which can be connected to the seismic energy source (not shown) to control initiation of the source should it prove necessary to locate the source near the C-unit 40.

All signal telemetry to and from the C-unit 40 is in optical form. A first optical transceiver 412 is connected to the C-ports 402. First detection of an optical signal at one of the ports 402 indicates the upstream direction is in the direction of that port 402. Signals detected later at the remaining C-port 402, which becomes the downstream port, and control signals received at the upstream port 402 are conducted to a central processor unit ("CPU") 422. Control signals which are to be relayed to downstream C-units 40 are conducted to the downstream C-port 402. The first optical transceiver 412 can operate using a 140 mHz carrier containing a digital signal having a bit rate of 98.304 mHz.

A second optical transceiver 410 is connected to the B-ports 404. The second optical transceiver 410 operates at the optical telemetry frequency of the B-units 15, which can be a 70 mHz carrier having a 49.152 mHz bit rate. Commands from the recording unit 50 are converted to the B-unit telemetry format in the CPU 422 and are then relayed downstream to B-units 15 through the second transceiver 410. Digitized signals from the B-units 15 are transferred to a buffer (not shown) in the CPU 422 from the second transceiver 410.

The communications port 424 is connected to the CPU 422 through several interfaces. A command signal, which is extracted from optical telemetry from the recording unit 50 by the CPU 422 to initiate the seismic energy source, is provided to a source control interface 420. The previously described pilot sensor channel 424B is provided to a pilot sensor analog-to-digital converter ("ADC") 416. The pilot sensor ADC 416 provides digital samples of the acoustic signature of the energy source as measured by the pilot sensor, which as is understood by those skilled in the art, is used in processing a seismic survey. Digital signal samples from the pilot sensor ADC 416 are processed in the CPU 422 for inclusion in the optical telemetry transmitted upstream to another C-unit 40 or to the recording unit 50 (depending on the exact upstream connection to the present C-unit 40).

The audio channel 424A is digitized in an audio channel ADC 414. Telephonic communication is possible to any other audio port in the sensor array (shown as 10 in FIG. 1) using optical telemetry to communicate to B-units 15 or other C-units 40, and to A-units 20 by digital-to-analog conversion, as previously described, in the B-unit 15 to which the A-units 20 are interconnected.

The serial data format on the RS-232 channel 424D is convened to a format compatible with the CPU 422 bus by an RS-232 interface, as shown at 418 interposed between the CPU 422 and the RS-232 channel 424D. A computer (not shown) can be connected to the RS-232 channel 424D to provide remote control of power-up and configuration of the portion of the spread 10 downstream from the C-unit 40. Test functions previously described herein can be controlled from the C-unit 40 by the computer (not shown) for any downstream C-units 40 and all B-units 15 and A-units 20 connected to the downstream C-units 40, or A- and B- units connected directly to the present C-unit 40. By providing local computer control of the C-unit 40, and in similar fashion to the B-units 15, it is possible to test portions of the spread 10 before assembly of the spread 10 is completed. Further, should a portion of the spread 10 encounter difficulties, the affected portion can be turned off or otherwise controlled to prevent transmission of any corrupted data to the recording unit 50, while recording from the rest of the spread 10 can proceed.

Electrical power for all the electronic systems as described herein in the C-unit 40 is provided by a DC to DC converter 408. Battery units similar to the battery units (such as 200A in FIG. 6B) used to power the B-units 15 can be used to power the C-unit. The battery units can connect to either or both of the battery ports 406 depending on the total amount of electrical energy which is expected to be consumed during a seismic survey. The DC to DC converter 408 in the C-unit 40 only has a 5-volt output since there is no provision for electrical power to be supplied to any other external unit from the present C-unit 40.

The CPU 422 in the C-unit 40 includes buffer capacity to store signals from as many as 3,000 individual sensor channels for retransmission to an upstream C-unit 40, or to the recording unit 50.

Figure 9:
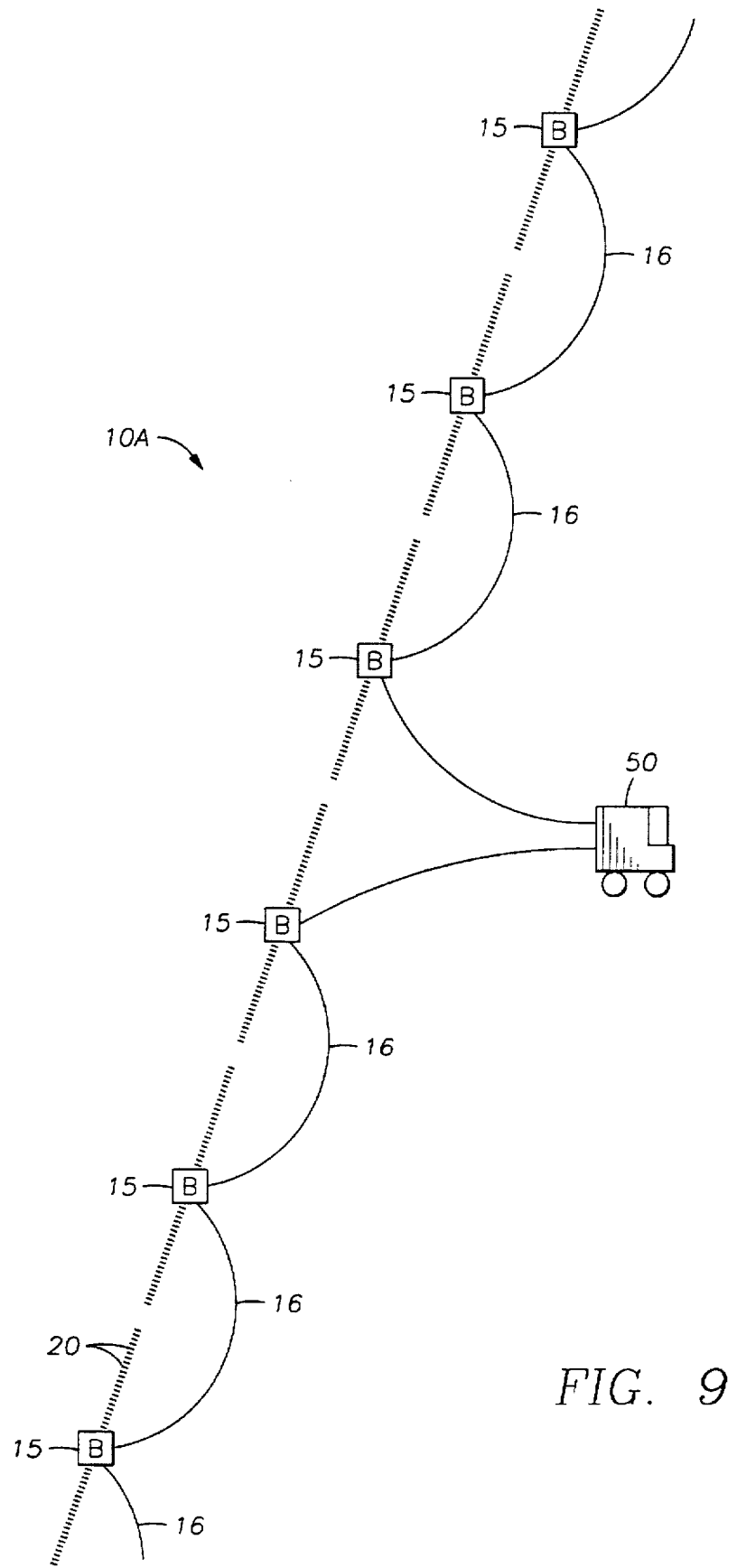
FIG. 9 shows an alternative seismic spread utilizing only A- and B-units.

The sensor spread (10 in FIG. 1) is shown as having C-units 40 interposed between the B-units 15 and the recording unit 50. However, the present invention can record a seismic survey from up to 3,000 individual signal channels without providing a C-unit 40. For example, FIG. 9 shows a spread 10A having only A-units 20 and B-units 15. The recording unit 50 can connect by optical telemetry to as many as two B-units 15. The optical telemetry can be the previously described B-link 16, or dual-channel optical fibers. B-units 15, as previously described herein, can be connected to other downstream B-units by similar optical telemetry. Each B-unit 15 can additionally have A-units 20 connected to either or both A-ports as previously described herein.

In operation, the recording unit 50 generates a command signal at each instance that the signal samples generated from each analog signal input at each A-unit 20 are to be transmitted back to the recording unit 50. The command signal is the previously referred to "staff of scan" command. The staff of scan command can be issued at a repetition rate which matches the desired digital signal sample rate for the analog input channels. In the present embodiment of the invention, the sample rate can be about 2 milliseconds (500 Hz). The staff of scan command is transmitted over the optical telemetry to the C-unit 40, if so used in the spread, or directly to the B-unit 15 closest to the recording unit 50 (if no C-unit 40 is used in the spread). The staff of scan command is converted to electrical telemetry in the B-units 15 for retransmission to the A-units 20 connected to each B-unit 15. Each A-unit 20 relays the staff of scan command to any other A-units 20 connected downstream.

As previously explained herein, the analog-to-digital converters (not shown separately) in the A-unit 20 can be delta-sigma converters each followed by a finite impulse response filter. Delta-sigma converters are so-called free running, meaning that the conversion is not synchronized to any external time reference. Upon receipt of the staff of scan command, the microcomroller (shown in FIG. 3 as 120) in the A-unit 20 instructs the data processor (shown as 116 in FIG. 3) to calculate digital sample values for each analog input which are time coincident with the staff of scan command signal. As previously explained, the digital sample values are then transferred to the transceiver (100 in FIG. 3) for retransmission to the upstream connected A-unit 20 or to the B-unit 15 if that is the upstream connection. Digital signal samples present in the A-unit 20 electrical telemetry therefore represent the analog sensor channel signal level substantially time coincident with the start of scan command. After reaching the upstream terminal A-unit 20, the serial signal stream representing measurements from each analog sensor input in the string of A-units 20 is transferred to the B-unit 15 for buffering and conversion to optical telemetry. Just as a signal burst from each A-unit 20 includes the address code for that A-unit 20 at the beginning of the burst, signal bursts from each B-unit 15 connected downstream from any other B-unit 15 will include all the digital signals from its interconnected A-units 20 and will include a burst header having the address of the particular B-unit 15. B-unit 15 signal bursts transmitted upstream to another B-unit 15 are buffered sequentially in the upstream B-unit 15, and are added to the signal burst from the upstream connected B-unit 15 until the upstream connections terminate in a C-unit 40 or the recording unit 50.

If the upstream B-unit 15 connections terminate in a C-unit 40, the buffering and retransmission process is repeated in a manner similar to that of the interconnected B-units 15, with the exception that the telemetry frequency can be twice that of the interconnected B-units 15. Providing a higher telemetry frequency between C-units 40 can increase the number of analog signal channels that can be recorded simultaneously.

The process described herein for "scanning" the signals from each analog sensor input is repeated at the scan rate until a survey "shot" is completely recorded, which can be a time span of several seconds to thirty seconds or more depending on the type of seismic energy source (not shown) which is used to conduct the survey.

Those skilled in the art will be able to devise variations of the embodiment of the invention disclosed herein without departing from the spirit of the invention. The invention should be limited in scope only by the claims appended hereto.

What is claimed is:

1. A seismic data acquisition system for communicating signals generated by seismic sensors to a recording unit, the system comprising:

a control unit connected to the recording unit; and analog-to-digital converter units connected to the control unit, each of the converter units including integral interconnecting cables having an hermaphroditic connector at each end, each of the converter units including analog inputs for the signals from the seismic sensors, each of the converter units having signal processing circuitry disposed within a watertight housing forming part of the integral interconnecting cables, the circuitry including analog-to-digital converters connected to the analog inputs, the circuitry including a first buffer for storing digitized signals transmitted to one of the converter units from another one of the converter units, the converter units being interconnected, the circuitry including a first digital transceiver for serially retransmitting digitized signals from the analog to digital converter and signals in the buffer at a first data rate to the control unit, and for retransmitting control signals sent from the control unit to the other converter units, the first transceiver for receiving control signals from the control unit and for receiving the digitized signals from the other ones of the converter units for storage in the first buffer:

the control unit including a second buffer for storing signals from the converter units and for buffering digitized signals retransmitted from other ones of the control units serially connected to the control unit, the control unit further including a second digital transceiver for retransmitting the buffered signals to the recording unit at a second data rate higher than the first data rate, and for receiving control signals transmitted from the recording unit at the second data rate.

2. The seismic acquisition system according to claim 1 wherein the second digital transceiver comprises an optical telemetry transceiver.

3. The seismic acquisition system according to claim 1 wherein the other ones of the control units are connected to the control unit by an optical telemetry fiber link.

4. The acquisition system according to claim 1 further comprising a data buffering unit interconnected between the control unit and the recording unit, the buffering unit including:

a central processing unit for buffering signals received from the control units and for buffering signals received from other ones of the data buffering units interconnected to the data buffering unit, the central processor including circuitry for reformatting the buffered signals from the control unit to a digital signal communicating with the recording unit at a third data rate higher than the second data rate;

a third digital transceiver for receiving the buffered signals from the control unit, and for retransmitting control signals sent from the recording unit addressed to the control unit;

a fourth digital transceiver for retransmission of the digitized signals received from the control unit to the recording unit and for receiving control signals from the recording unit, the fourth transceiver for receiving buffered digitized signals from other ones of the data buffering units serially connected to the data buffering unit in a direction opposite to the recording unit, the fourth digital transceiver also for retransmitting control signals from the recording unit to the other ones of the data buffering units, the fourth digital transceiver operating at a rate corresponding to the third data rate of the digital signal communicating to the recording unit.

5. The data buffering unit according to claim 4 wherein the third and the fourth digital transceivers comprise optical telemetry transceivers.

6. The acquisition system according to claim 4 wherein the control signals include address codes for each one of the control units and the data buffering units.

7. The acquisition system according to claim 4 further comprising battery units connected to the control units and to data buffering units, the battery units providing electrical power to the control units and to the data buffering units.

8. The control unit according to claim 7 further comprising a power converter adapted to provide electrical power to the converter units serially interconnected to the control unit.

9. The acquisition system according to claim 1 wherein the interconnecting cables further include an audio signal channel adapted to provide a signal line for telephonic voice communication between any of the converter units interconnected to the control unit without powering the control unit.

10. The converter unit according to claim 9 wherein the signal processing circuitry includes internal test functions for the converter unit actuable by sending a test command signal from the recording unit, the internal test functions comprising preamplifier gain test, analog-to-digital accuracy conversion tests and analog sensor channel isolation tests.

11. The acquisition system according to claim 10 wherein the control unit further comprises a modem connected to the audio signal channel of the interconnected converter units to enable commands from a computer to be imparted to the audio signal channel at any one of the converter units to remotely operate the control unit so that the test command signal can be transmitted from the control unit without activation by the recording unit.

12. A seismic system for communicating signals generated by seismic sensors to a recording unit, the system comprising interconnecting cable units connected to a control unit, the control unit connected to the recording unit, wherein the interconnecting cable units each include:

a length of insulated electrical cable;

an hermaphroditic connector at each end of the length of cable;

a sealed electronics housing located between the hermaphroditic connectors so as to form a part of the lengths of cable; and a signal processing unit disposed within the housing, the signal processing unit including:

a) an analog seismic sensor input, b) an analog-to-digital converter connected to the analog seismic sensor input, c) a digital filter connected to an output of the converter, d) a line power direction detector connected to first electrical conductors in the length of cable for detecting which end of the cable unit is connected to a source of electrical power, e) a bi-directional digital transceiver connected to second electrical conductors in the length of cable for transmitting digitized seismic sensor signals in the direction of the source of electrical power and receiving command signals from the direction of the source of electrical power, the digital transceiver for retransmitting the control signals to other ones of the cable units connected opposite to the source of power and for receiving digitized seismic sensor signals from other ones of the cable units connected opposite the source of electrical power, f) a command processor connected to the transceiver for decoding command signals received by the transceiver, g) a data processor interconnected between the digital filter and the transceiver for receiving digitized sensor signals from the other ones of the cable units and combining with the received sensor signals digitized sensor signals output from the digital filter for application to the transceiver, thereby to send combined signals in the direction of the source of power, and h) a microcontroller connected to the line power direction detector, the command processor and the data processor for controlling transmission of digitized sensor signals in accordance with instructions embedded in the command signals, and for operating testing functions for the analog-to-digital converter, the interconnecting cable trait further including an audio signal channel comprising a transformer-coupled ghost pair of the second electrical conductors, and adapted to transmit telephonic signals to other ones of the interconnecting cable units irrespective of a state of activation of the interconnecting cable units.

13. The seismic acquisition system as defined in claim 12 further comprising battery booster units, each one of the battery booster units including:

a sealed housing having hermaphroditic connectors, the connectors having a configuration of electrical conductors similar to the interconnecting cable unit; and control circuitry disposed within the housing, the circuitry including a bi-directional digital transceiver providing telemetry compatible with the transceiver in the interconnecting cable units, a power direction detector connected to the cable for determining the direction of a source of electrical power present on the connectors from the interconnecting cable units, a power converter for changing voltage of a battery connected to the battery booster to a voltage used by the interconnecting cable units, a power connection circuit for connecting an output of the power converter to the connectors in a direction opposite to the source of electrical power detected by the direction detector, and a data buffer for receiving digitized signals from interconnected ones of the cable units connected to the battery booster opposite to the source of electrical power, and retransmitting the signals to another one of the interconnecting cable units connected in the direction of the source of electrical power, the battery booster unit further including the audio signal channel for enabling telephonic communication when the battery unit is interconnected to the interconnecting cable units.

14. The seismic acquisition system as defined is claim 12 wherein the control unit further comprises:

an electrical signal transceiver electrically connected to one end of the interconnecting cable unit for receiving the combined signals from the interconnecting cable unit, the electrical transceiver for transmitting commands from the control unit to the cable unit;

a central processor connected to the transceiver for converting the combined signals to a high frequency telemetry and for converting command signals from a data recording unit connected to the control unit into a low frequency telemetry for retransmission to the cable unit by the electrical signal transceiver;

an optical transceiver connected to the central processor for retransmitting the converted signals to the recording unit and for receiving the command signals sent from the recording unit, the optical transceiver operating at the high telemetry frequency; and a communications interface connected to the central processor for providing an audio signal channel enabling telephonic communication to the interconnecting cable units and to the recording unit, and a serial computer interface for enabling remote operation of the control unit by a computer connected to the serial computer interface.

15. The seismic acquisition system as defined in claim 14 further comprising a data buffering unit interconnected between the control unit and the recording unit, the buffering unit including:

a first optical transceiver for receiving signals from the control unit and for retransmitting control signals to the control unit;

a second optical transceiver for receiving command signals sent from the recording unit and for retransmitting signals from the control unit to the recording unit;

a central processor unit for buffering signals received from the control unit and for buffering signals received from other ones of the buffering units connected to the buffering unit, the central processor for combining the buffered signals from the control unit and from the other ones of the buffering unit for retransmission to the recording unit by the second optical transceiver at a frequency higher than the high telemetry frequency of the optical transceiver in the control unit, the central processor for generating address codes for each of the control unit and the other ones of the data buffering units and for selectively retransmitting control signals from the recording unit to the control unit and the other ones of the data buffering units.

16. The data buffering unit as defined in claim 15 further comprising a pilot sensor analog-to-digital converter and an energy source controller, the pilot sensor analog-to-digital converter for generating digital signal samples of a signal generated by a pilot sensor disposed near a seismic energy source for determining an acoustic signature of the source, the energy source controller providing an actuation signal to the seismic energy source by decoding a command signal transmitted from the recording unit to the buffering unit, whereby the seismic energy source can be located remotely from the recording unit and controlled locally from the buffering unit.

17. The data buffering unit as defined in claim 15 further comprising an audio channel digitizer for generating digital signal samples of an analog audio input, the digital signal samples converted in the central processor for inclusion in telemetry from the first optical transceiver for audio communication with the recording unit, the digital signal samples converted in the central processor for inclusion in telemetry from the second optical transceiver for audio communication with any other ones of the buffering units, the control units and the interconnecting cables units.

18. A seismic data acquisition system for communicating signals generated by seismic sensors to a recording unit, the system comprising:

a. a control unit connected to the recording unit; and b. analog-to-digital converter units connected to the control unit, each of the converter units including:

i. integral interconnecting cables having an hermaphroditic connector at each end;

ii. analog inputs for the signals from the seismic sensors;

iii. signal processing circuitry including: analog-to-digital converters connected to the analog inputs; a first buffer for storing digitized signals transmitted to one of the converter units from another one of the converter units, the converter units being interconnected, a first digital transceiver for serially retransmitting digitized signals from the buffer at a first data rate to the control unit, and for retransmitting control signals from the control unit to the other converter units, the first transceiver for receiving control signals from the control unit and for receiving the digitized signals from the other ones of the converter units, for storage in the first buffer, the control unit including:

i. a second buffer for storing signals from the converter units and for buffering digitized signals retransmitted from other ones of the control units;

ii. a second digital transceiver for retransmitting the buffered signals to the recording unit at a second data rate higher than the first data rate, and for receiving control signals transmitted from the recording unit at the second data rate.

* * * * *

UNITED STATES PATENT AND TRADEMARK OFFICE
CERTIFICATE OF CORRECTION

PATENT NO. : 5,627,798
DATED : May 6, 1997
INVENTOR(s) : Lee E. Siems et al.

It is certified that error appears in the above-identified patent and that said Letters Patent is hereby corrected as shown below:

In the Abstract:

line 3, "conveyer" should read --converter--.

line 4, "conveyer" should read --converter--.

line 9, "conveyers" should read --converters--.

line 11, "conveyer" should read --converter--.

line 15, "conveyer" should read --converter--.

line 17, "codected" should read --connected--.

line 19, "conveyer" should read --converter--.

line 26, "digited" should read --digitized--.

Column 2, line 14, "dam" should read --data--.

Column 2, line 20, "dam" should read --data--.

Column 2, line 28, "deadtime" should read --dead-time--.

Column 8, line 22, "dam" should read --data--.

Column 8, line 26, "A-trait" should read --A-unit--.

Column 13, line 42, "hi-directional" should read --bi-directional--.

Column 16, line 12, "convened" should read --converted--.

Column 16, line 64, "staff" should read --start--.

Column 16, line 65, "staff" should read --start--.

UNITED STATES PATENT AND TRADEMARK OFFICE
CERTIFICATE OF CORRECTION

PATENT NO. :     5,627,798
DATED      :     May 6, 1997
INVENTORS(s):    Lee E. Siems et al.

It is certified that error appears in the above-identified patent and that said Letters Patent is hereby corrected as shown below:

Column 17, line 3, "staff" should read --start--.
Column 17, line 6, "staff" should read --start--.
Column 17, line 9, "staff" should read --start--.
Column 17, line 16, "staff" should read --start--.
Column 17, line 20, "staff" should read --start--.
Column 20, line 12, "trait" should read --unit--.

Signed and Sealed this

Ninth Day of September, 1997

BRUCE LEHMAN

Attest:

Attesting Officer

Commissioner of Patents and Trademarks